United States Patent [19]

Langley

[11] Patent Number: 5,025,583
[45] Date of Patent: Jun. 25, 1991

[54] FISHING ROD HOLDER AND SIGNAL ASSEMBLY

[76] Inventor: Donald J. Langley, 30222 Sumac Dr., Burlington, Wis. 53105

[21] Appl. No.: 568,758

[22] Filed: Aug. 17, 1990

[51] Int. Cl.⁵ .............................................. A01K 85/01
[52] U.S. Cl. .......................................... 43/17; 43/21.2
[58] Field of Search ................................. 43/17, 21.2

[56] References Cited

U.S. PATENT DOCUMENTS

| | | | |
|---|---|---|---|
| 2,646,240 | 7/1953 | Anderson | 43/21.2 |
| 3,037,314 | 6/1962 | Hardy | 43/17 |
| 3,120,072 | 2/1964 | Rybarski | 43/17 |
| 3,190,026 | 6/1965 | Roszak | 43/17 |
| 3,568,352 | 3/1971 | Hill | 43/17 |
| 3,680,244 | 8/1972 | Cala | 43/17 |
| 3,824,730 | 7/1974 | Johnson | 43/17 |
| 3,879,880 | 4/1975 | Bailey | 43/17 |
| 3,882,629 | 5/1975 | Kaye | 43/17 |
| 4,155,188 | 5/1979 | Serrill | 43/17 |
| 4,407,089 | 10/1983 | Miller | 43/21.2 |
| 4,633,608 | 1/1987 | Savarino | 43/17 |

Primary Examiner—Richard K. Seidel
Assistant Examiner—Patty E. Hong
Attorney, Agent, or Firm—Arthur J. Hansmann

[57] ABSTRACT

A fishing rod holder and signal assembly having a rod holder device attached to a mounting member for upwardly supporting the rod holder. A pivotal signal tube is mounted on the rod holder and presents either a flag signal or a light source signal for indicating the bite of a fish on the fish line releasably strung relative to the holder signal.

23 Claims, 1 Drawing Sheet

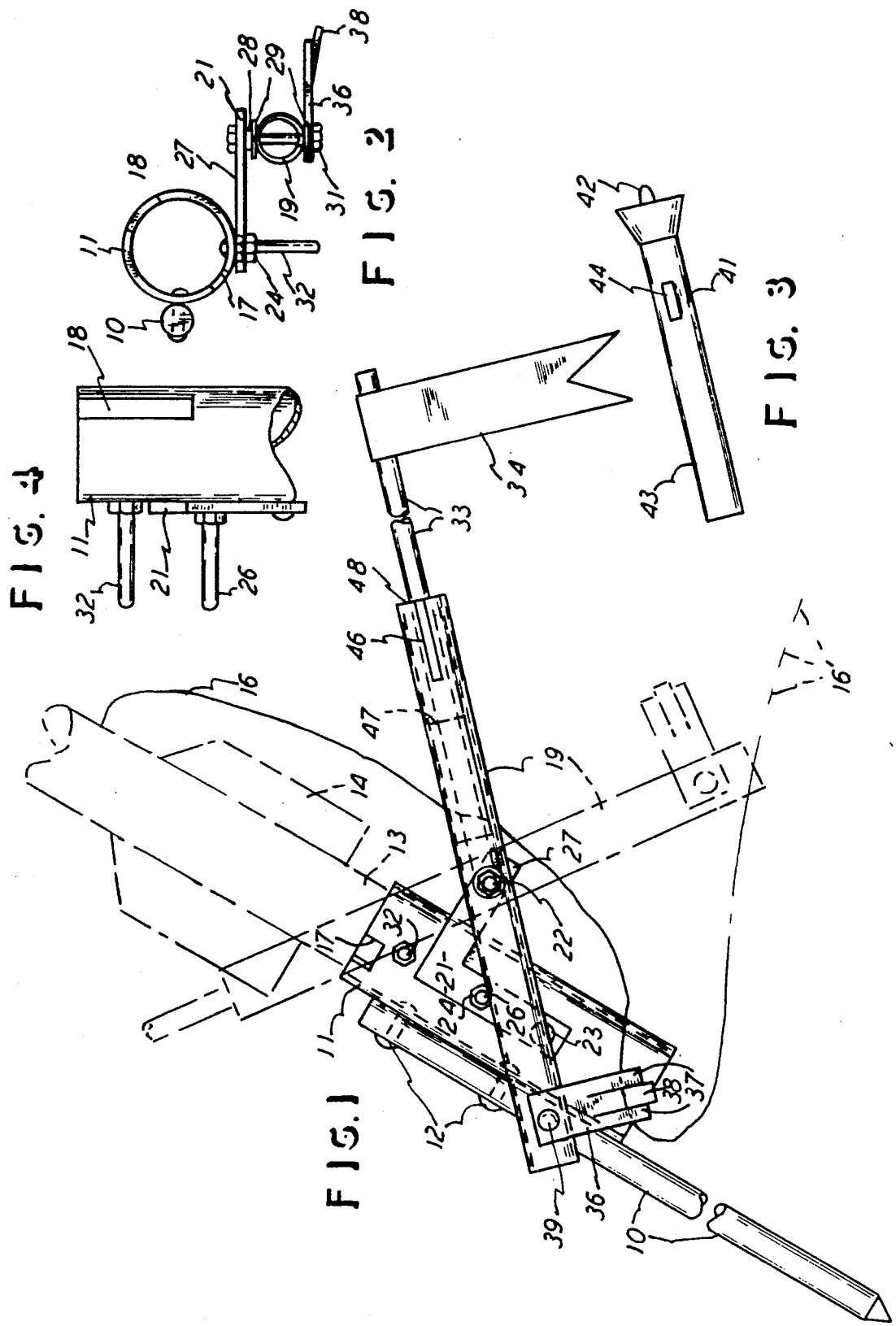

FISHING ROD HOLDER AND SIGNAL ASSEMBLY

This invention relates to a fishing rod holder and signal assembly, and, more particularly, it relates to a fishing device wherein the fishing pole and line can be supported in the device and a signal is activated to show that a fish is on the fish line.

BACKGROUND OF THE INVENTION

The prior art is already aware of fishing devices which are self-supportive and operative so that the fisherman can be at a distance away from the fish line or pole itself That is, the device will support the line and-/or the pole, and when a fish pulls on the line, then the device signals the fisherman who can then approach the fish line and pull in the fish on the line. Particularly, these prior art devices are already available for supporting a fish pole or fish rod which has a reel and the usual fish line thereon. Still further, these devices can be self-supported, such as by inserting them into the ground or mounting them on a structure. Also, these prior art devices commonly include a signal, such as a flag, light, or an audible signal, all of which are activated when the fish pulls on the respective fish line.

Examples of the prior art are shown in the following U.S. patents:
U.S. Pat. No. 3,037,314
U.S. Pat. No. 3,120,072
U.S. Pat. No. 3,568,352
U.S. Pat. No. 3,680,244
U.S. Pat. No. 4,155,188
U.S. Pat. No. 4,633,608

The present invention improves upon the prior art in that it provides a fish rod holder and signal assembly which is simplified in its construction and is therefore more reliable in its action of indicating when a fish is pulling on the fish line.

Still further, the present invention is an improvement upon the prior art in that it provides a ready and easy manner of releasably receiving a standard fishing rod, and it thereby permits the fisherman to readily remove the rod from the holding and signal assembly device when a fish is pulling on the fish line.

Still further, the present invention improves upon the prior art in that it provides a reliable and readily detectable signaling of the fish pulling on the line, and it does so by employing only one movable part and, even further, by being adaptable to receive fishing rods of various constructions.

Further, this invention provides a fish signal which is arranged to incorporate either a flag or a light source, in accordance with the desires of the fisherman who can readily and easily arrange the device with either signal employed.

Also, the device itself operates with its usual ease of operation and the same reliability when either type of signal is employed the device.

BRIEF DESCRIPTION OF THE DRAWINGS

FIG. 1 is a side elevational view of a preferred embodiment of this invention, showing certain parts thereof in dot-dash lines FIG. 2 is a top axial view of the device in FIG. 1 with the signal tube axially parallel to the fishing rod holder tube.

FIG. 3 is a side elevational view of the light source signal.

FIG. 4 is a side elevational view of a fragment of the device shown in FIG. 1 but with the signal holder itself removed.

DETAILED DESCRIPTION OF THE PREFERRED EMBODIMENT

The fishing rod holder and signal assembly is shown to have a standard 10 which is in the form of a pole which can be inserted in the ground, or which can be attached to a boat, pier, or other structure, and extend generally upwardly. As shown, the standard is extending at approximately a sixty degree angle which is the orientation of preferred actual use of this device. The upper end of the standard 10 supports a rod holder 11 which is an open-ended tubular member and which is secured to the standard 10 by means of fasteners 12 Thus, the longitudinal axis of the tubular holder 11 extends in the upright direction and at approximately the sixty-degree angle with the horizontal plane. A conventional fishing rod is shown in dot-dash lines extending above the holder 11 and it includes the rod handle 13 and the fish-line reel 14 Thus a fish line 16 is shown to extend from the reel 14 and downwardly and off into the location indicated at 16'.

At this point it will therefore be seen and understood that a conventional fishing rod with its handle 13 and reel 14 can be readily inserted into the depths of the tubular holder 11, and the rod can be readily removed therefrom such as in response to a fisherman's desire to pull in a fish. Also, the upper end of the holder 11 has two notches 17 and 18, such as seen in FIGS. 1, 2, and 4, and these two different size notches 17 and 18 accommodate different brackets or structures on conventional fishing rods to receive those different structures, such as brackets for holding the reel 14, and thus the fishing rod is securely and non-rotatably supported in the tubular holder 11 but is readily and easily removed therefrom by moving the rod along the longitudinal axis of the holder 11.-Of course the portion of the conventional fishing rod engaged in the respective slot 17 or 18 will also limit the extent to which the fishing rod is inserted into the holder 11. It will be further noted that the reel 14 is shown to be out of the way of the remainder of the device hereinafter described.

A device or assembly also includes a tube or sleeve 19, which is a signal means in this description, and the tube 19 is pivotally mounted on the holder 11 by means of a bracket 21 which is a mounting member presenting a pivot pin 22 extending through the intermediate portion of the longitudinal length of the tube 19, as shown in FIGS. 1 and 2. Thus, the bracket 21 is secured to the outside of the holder 11 by means of a fastener 23 and a nut 24 surrounding a pin 26. Therefore, the bracket 21 has a laterally extending arm 27 which is affixed with the holder 11 and which presents the pivot pin 22 for the pivotal signal means 19.

FIG. 2 shows that there is a spacer 28 between the bracket 21 and a washer 29 adjacent the tube 19. Also, there is another washer 29 on the outside portion of the tube 19, and a self-locking nut 31 is on the end of the suitably threaded pivot pin 22 to secure the sleeve 19 on the bracket 21 but to permit free pivotal action of the tube 19.

FIGS. 1 and 2 further show that the pin 26 is in the clockwise path of pivotal movement of tube 19, and thus the pin 26 serves as a stop means for the clockwise pivotal motion of the tube 19, such as shown in the full line position in FIG. 1. That position is of course the non-signaling position and it is simply the position which the assembly is in while waiting for a fish to pull on the fish line 16. That arrangement means that the holder 11 and the pivot tube 19 are offset from each other, as clearly seen in FIG. 2, so that the tube 19 can pivot off to the side of the holder 11 without touching the holder 11. However, as indicated, the stop means 26 is in the path of pivot of the tube 19, and thus the stop means 26 determines the set position of the assembly while waiting for a fish to bite.

FIG. 1 further shows that the tube 19 can pivot counter-clockwise to the dot-dash line position shown in FIG. 1. To that limit position of pivot, the tube 19 is then against a stop pin 32, which is a stop means and, like the stop pin 26, is affixed to the holder 11 and extends to the side thereof into the pivot path of the tube 19 to thereby determine the counter-clockwise limit of pivot of the tube 19 as shown by the dot-dash lines. Thus, the solid line position for tube 19 is the reclining position, and the dot-dash line position for the tube 19 is the upright position as being described herein.

FIG. 1 further shows that there is a signal 33 on the tube 19, and it is shown to be in the form of a flag 34 having its staff inserted into the tube 19 and down to the location of the pivot pin 22, and of course the flag 34 would extend beyond the tube 19 to whatever extent one desires to have the length of the staff 33. Then, in the upright or signaling position of the tube 19, the flag 34 is elevated to a position higher than that shown in solid lines in FIG. 1, and of course the fisherman would then know that the tube 19 has been pivoted to an activated position.

In accomplishing the activated or fish-bite position for the tube 19, the fish line 16 is strung through a releasable fish line holder 36 which is shown to be a clip member having two outer fingers 37 and one spring and inner finger 38. The fish line 16 is threaded through the three fingers to be releasably held by the clip 36. When there is sufficient pull on the fish line 16', then the tube 19 will pivot from its solid line or ready position to its dot dash line or signaling position and against the stop 32. At that time, the line 16' is readily pulled free of the clip 36 because the fish is pulling on the line. At that point the fisherman receives the signal by virtue of the flag 34 being in the elevated position, and he can then go to the device and retract the fishing rod and continue to catch the fish. Of course the clip 36 is affixed to the lower end of the tube 19, such as by the fastener 39, and it always remains disposed in the position so that the fish line 16' can be pulled free of the clip 36 by moving the line along the length of the three fingers 37 and 38.

FIG. 3 shows that there can also be a signal in the form of a light source, and here a flashlight 41 can be the light source having a light bulb 42, and this can be of a conventional type of flashlight The flashlight case or body 43 is of a cylindrical size to be snugly received within the hollow tube 19, and the off/on flashlight switch 44 can be snugly disposed within an end slot 46 extending along the tube 19, as shown in FIGS. 1 and 2. The light source 41 can be of the tilting switch type, such as the mercury switch, so that the light bulb 42 is not energized in the reclining position, but so that it is energized in the upstanding or dot-dash line position when it is substituted for the flag 33 in the holder 19. That of course permits night-time fishing, and the light will be seen only when the tube 19 is in the activated or upright position indicating that there has been a pull on the line 16' and that the releasable retainer 36 has retained the fishline to cause the tube 19 to pivot to the upright signaling position at which point the retainer 36 releases the fish line.

In this arrangement, it will be seen and understood that the weight of whichever signal device is used, and the weight of the end of the tube 19 which is receiving the signal device, are combined at a greater weight than the weight of the lower end of the tube 19 and the weight of the line retainer 36. That is, the upper end of the tube 19 is always of a greater weight than the lower end of the tube 19, relative to the pivot pin 22, and thus the tube 19 is always in the overbalanced position of either the solid line ready position or the dot-dash line signaling position and those position will therefore be retained until there is a force on the tube 19 to alter those positions. To assure the over-balanced position when the flag 33 is being used, there can be a counter-weight 47 attached to the flag staff 33. Also, the light source 41 is of sufficient weight to assure the over-balance previously described, and it can also be of a length so that the cylindrical body portion 43 extends from a resting position against the pivot pin 22 and to the very upper edge 48 of the tube 19.

What is claimed is:

1. The fishing rod holder and signal assembly, comprising a standard capable of being uprightly supported, a fishing rod holder attached to the upper end of said standard and being arranged for removably receiving and supporting a fishing rod, signal means pivotally included in said assembly and having a fixed pivot axis intermediate along said signal means for pivot of said signal means about said pivot axis in both directions of pivot, stop means included in said assembly and being in both paths of pivot of said signal means which pivots against said stop means for establishing a first limit pivot position of said signal means with one end of said signal means lower than the end opposite said one end and for also establishing a second limit pivot position of said signal means with said other end higher than said one end, a fish line releasable retainer on said one end of said signal means for retaining a fish line against the weight of the fish line and being arranged to respond to a fish-pull on the fish line to pivot said signal means to said second limit pivot position and to then subsequently release the fish line in response to said signal means pivoting against said stop means in said second limit pivot position, a signal included in said signal means at said other end thereof, the weight of said signal means with said signal being greater at said other end than the weight of said one end to thereby have said signal means with said signal overbalanced in both limit pivot positions to alternately retain said signal in said lower and said higher positions respectively before and after said signal means is pivoted to said limit pivot positions against stop means, said signal means includes a tube pivotally mounted on said rod holder, and with said tube presenting said signal means one end and said signal means opposite end, and said stop means being mounted on said rod holder and extending into the pivot path of said tube at said first limit pivot position and at said second limit pivot position of said tube.

2. The fishing rod holder and signal assembly as claimed in claim 1, wherein said fishing rod holder is a tubular member for removably receiving the handle of said fishing rod, and said tubular member being disposed with its longitudinal axis upright.

3. The fishing rod holder and signal assembly as claimed in claim 2, wherein said tubular member has a notch in the upper end thereof for receiving a portion of said fishing rod in a non-rotatable restraining manner.

4. The fishing rod holder and signal assembly as claimed in claim 1, wherein said signal is removably disposed in said tube and extends therefrom at said other end of said tube.

5. The fishing rod holder and signal assembly as claimed in claim 4, wherein said signal is a visible display type of signal and is slidably snugly received in said tube and is slidably removable therefrom.

6. The fishing rod holder and signal assembly as claimed in claim 5, wherein said flag and said light source are of substantially the same weight for influencing the pivot position of said tube.

7. The fishing rod holder and signal assembly as claimed in claim 1, wherein said signal means is pivotal between a reclining position and an upright position respectively against said stop means, and said signal is a light source having an on/off switch arranged to be activated in accordance with said reclining and said upright position.

8. The fishing rod holder and signal assembly as claimed in claim 1, wherein said stop means consists of two spacedapart projections mounted on said rod holder and extending therefrom into the pivot path of said signal means.

9. The fishing rod holder and signal assembly as claimed in claim 1, wherein the pivot axis of said signal means is offset to one side of said rod holder.

10. The fishing rod holder and signal assembly as claimed in claim 9, wherein said stop means consists of two spacedapart projections mounted on said rod holder and extending therefrom into the pivot path of said signal means.

11. The fishing rod holder and signal assembly as claimed in claim 1, wherein said signal is a visible display type of signal and is slidably snugly received in said tube and is slidably removable therefrom.

12. The fishing rod holder and signal assembly as claimed in claim 1, wherein the pivot axis of said tube is offset to one side of the longitudinal axis of said rod holder.

13. A fishing rod holder and signal assembly comprising a tubular member fishing rod holder arranged for removably receiving and supporting a fishing rod and being disposed with its longitudinal axis upright, signal means including a tube and being pivotally mounted on said rod holder and having a pivot axis, stop means mounted on said rod holder and extending into the pivot path of said tube which pivots against said stop means for establishing a reclining position of said signal means and for also alternately establishing an upright position of said signal means, a fish line releasable retainer on said signal means for retaining only a fish line against the weight of the fish line and being arranged to respond to a fishpull on the fish line to pivot said signal means to said upright position and to then subsequently release the fish line in response to said signal means pivoting against said stop means in said upright position, the weight of said signal means being sufficient and distributed relative to tis said pivot axis to thereby have said signal means overbalanced in both limit pivot positions.

14. The fishing rod holder and signal assembly as claimed in claim 13, wherein said signal means is arranged to removably receive two different forms of said signals mutually exclusively includable in said signal means.

15. The fishing rod holder and signal assembly as claimed in claim 13 wherein said stop means consists of two spacedapart projections mounted on said rod holder and extending therefrom into the pivot path of said signal means.

16. The fishing rod holder and signal assembly as claimed in claim 13, wherein signal means includes a pivotal tube and is arranged to mutually exclusively removably receive one of two different forms of said signals selectively mounted in said tube.

17. A fishing rod holder and signal assembly of the type including a standard capable of being uprightly supported, a fishing rod holder attached to the upper end of said standard and being arranged for removably receiving and supporting a fishing rod, signal means pivotally included in said assembly, stop means included in said assembly and being in both paths of pivot of said signal means which pivots against said stop means for establishing a first limit pivot position of said signal means with one end of said signal means lower than the end opposite said one end and for also establishing a second limit pivot position of said signal means with said one end higher than said opposite end, a signal included in said signal means at said opposite end thereof, the weight of said signal means with said signal being greater at said opposite end than the weight of said one end to thereby have said signal means with said signal overbalanced in both limit pivot positions to alternately retain said signal in said lower and said higher positions respectively before and after said signal means is pivoted to said limit pivot positions against said stop means, the improvement comprising said signal mean having a fixed pivot axis fixed intermediate along said signal means for pivot of said signal means about said pivot axis in both directions of pivot, and a fish line releasable retainer on said one end of said signal means for retaining a fish line against the weight of the fish line and being arranged to respond to an initial pull on the fish line by a fish and to thereby pivot said signal means to said second limit pivot position and being arranged to then subsequently automatically release the fish line in response to further pull on the fish line by the fish and in the direction of the initial pull and when said signal means is pivoted against said stop means in said second limit pivot position.

18. The fishing rod holder and signal assembly as claimed in claim 17, wherein said fishing rod holder is a tubular member for removably receiving the handle of said fishing rod, and said tubular member being disposed with tis longitudinal axis upright.

19. The fishing rod holder and signal assembly as claimed in claim 18, wherein said tubular member has a notch in the upper end thereof for receiving a portion of said fishing rod in a non-rotatable restraining manner.

20. The fishing rod holder and signal assembly as claimed in claim 17, wherein said signal means includes a pivotally mounted tube, and said signal is removably disposed in said tube and extends therefrom at said opposite end of said tube.

21. The fishing rod holder and signal assembly as claimed in claim 20, wherein said signal is a visible display type of signal and is slidably snugly received in said tube and is slidably removable therefrom.

22. The fishing rod holder and signal assembly as claimed in claim 21, wherein said signal is a flag and a light source which are substantially of the same weight for influencing the pivot position of said tube and which are usable interchangeably in insertion into said tube.

23. The fishing rod holder and signal assembly as claimed in claim 17, wherein said releasable retainer has an opening therein faced in the direction away from said signal means and with said releasable retainer being arranged to release the fish line through said opening in response to the pull on the fish line by a fish.

* * * * *